UNITED STATES PATENT OFFICE.

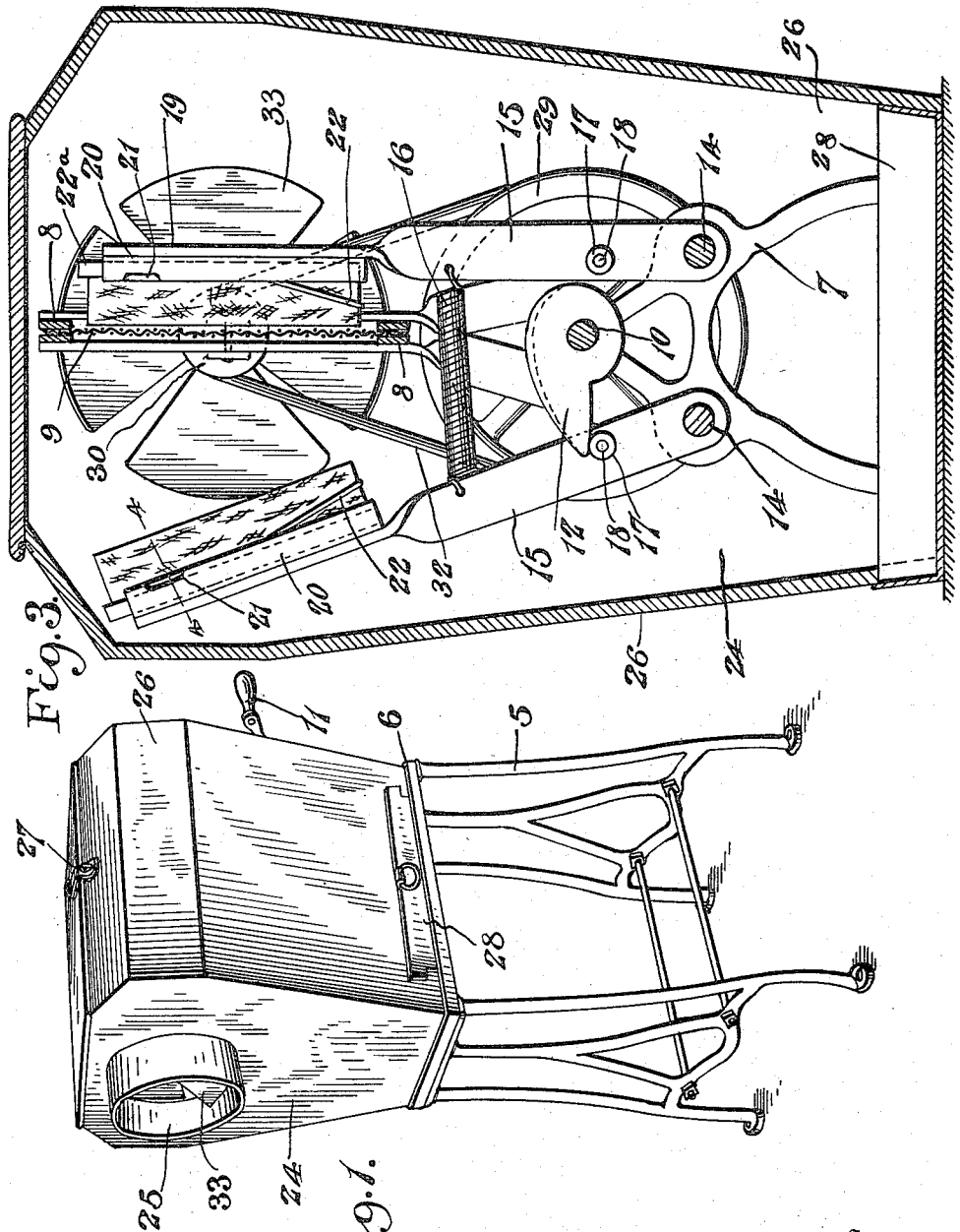

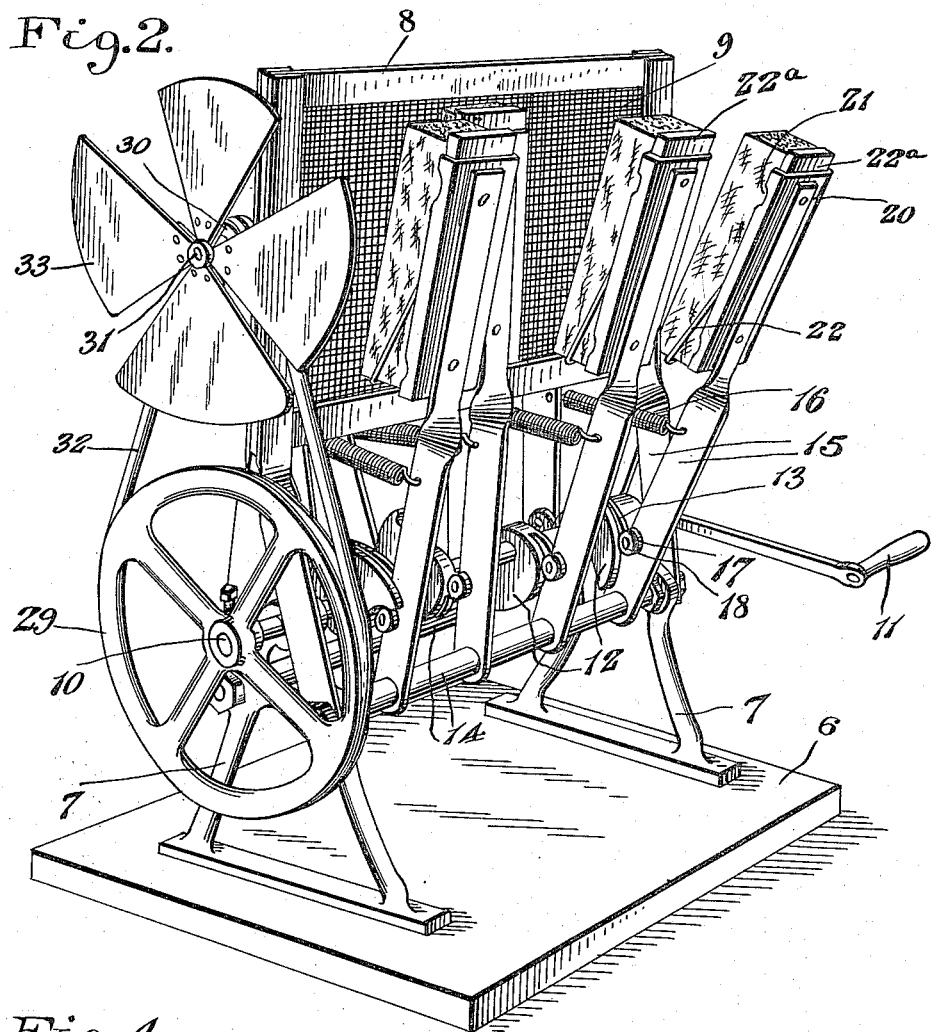

JOHN W. JOHNSON, OF CHICAGO, ILLINOIS.

ERASER-CLEANER.

1,155,242.

Specification of Letters Patent.

Patented Sept. 28, 1915.

Application filed January 11, 1915. Serial No. 1,652.

*To all whom it may concern:*

Be it known that I, JOHN W. JOHNSON, a citizen of the United States, residing at Chicago, in the county of Cook and State of Illinois, have invented certain new and useful Improvements in Eraser - Cleaners; and I do hereby declare the following to be a full, clear, and exact description of the invention, such as will enable others skilled in the art to which it appertains to make and use the same.

This invention relates to eraser cleaners or beaters, and has for its object to provide a machine of this character of generally improved and simplified construction.

Another object is the provision of an eraser cleaner including a plurality of eraser holders carried by arms operably connected with the operating mechanism whereby the erasers are struck against a suitable beater plate.

Another object is the provision of a suitable hood covering the machine and having an outlet opening in which is arranged a fan connected with the operating mechanism of the cleaner and adapted to expel the air from the hood.

With these and other objects in view, the invention consists in the novel construction, arrangement and formation of parts as will be hereinafter specifically described, claimed and illustrated in the accompanying drawings, in which:

Figure 1 represents a perspective view of the eraser cleaner complete. Fig. 2 represents a perspective view of the cleaner, showing the hood removed. Fig. 3 represents a vertical sectional view through the cleaner, and Fig. 4 represents an enlarged detail sectional view on the line 4—4 of Fig. 3.

Referring to the drawing in detail, wherein similar reference numerals designate corresponding parts throughout the several views, the numeral 5 indicates a suitable stand or support on which is secured a base plate 6. A pair of spaced vertically disposed uprights or standards 7 are secured upon the base plate 6 and a rectangular frame 8 is secured between the upper extremities thereof. A beater member 9, preferably formed of wire mesh, or other foraminous material, is secured in the rectangular frame 8. A cam shaft 10 is rotatably mounted in the standards 7 and a removable operating crank 11 is secured upon one end thereof. A plurality of cams 12 are secured upon the shaft 10 between the standards 7 and are formed with circumferential channels 13. A pair of shafts 14 are secured between the standards 7 below and upon opposite sides of the main cam shaft 10 and a plurality of arms 15 are pivotally mounted at their lower extremities upon said shafts 14. The arms 15 are arranged in pairs and the arms of each pair are connected intermediate their ends by a spring 16 which normally tends to draw the arms together and retain the upper extremities thereof against the beater member 9. Bearing rollers 17 are rotatably mounted upon laterally projecting stub-shafts or pins 18 carried by the arms 15 and are adapted to engage the cams 12 upon opposite sides of the circumferential grooves 13 so as to reduce friction and wear of the parts of the machine. It will be understood, that one of the cams 12 is arranged on the shaft 10 between the arms 15 of each pair, whereby the arms of each pair are operated by one cam. As clearly illustrated in Fig. 3, the rollers 17 are arranged slightly inwardly of the inner longitudinal edges of the arms 15, whereby the edge portions of the arms are engaged within the circumferential grooves 13 of the cams and thus the arms are guided and prevented from swinging laterally.

The upper extremities 19 of the arms are twisted and eraser holders 20 are secured thereto. The holders 20 are preferably formed of sheet metal and are U-shaped in cross section, the parallel portions thereof being provided with inwardly struck portions 21 to engage and clamp the solid body of an eraser and prevent the accidental removal thereof during the operation of the machine. Wire supports 22 of U-shaped formation are secured at their free extremities to the parallel portions of the holders and engage beneath the erasers to prevent the latter from slipping downwardly out of the holders.

As clearly illustrated in Figs. 1 and 3 a hood designated generally by the numeral 24 is removably positioned upon the base plate 6 and completely incloses the operating parts of the cleaner except the hand crank 11. The hood may be formed of sheet metal, fibrous or other material and is provided with an outlet port 25 the edge portion of which is directed outwardly to provide an annular flange whereby a flue may be connected therewith. The sides 26 of the hood are secured in closed position by hasp fasteners or equivalent means 27. A sliding drawer, or receptacle 28, is positioned through an elongated opening in the lower portion of one hinged side 26 and is supported upon the base plate 6 for receiving and containing the particles of dust which may accumulate in the cleaner during its operation.

A fly wheel or pulley 29 is keyed on the end of the shaft 10 opposite the hand crank 11 and a pulley 30 is rotatably mounted upon a shaft 31 secured in one of the standards 7 above the fly wheel or pulley 29 and the fly wheel and pulley 30 are connected by a belt 32. A bladed wheel, or fan, 33 is keyed upon the pulley 30 and projects into the outlet opening 25 of the hood for exhausting the air in the latter during the operation of the machine and to assist in dispelling the chalk dust from the hood.

What I claim is:

In a device of the character described, comprising a pair of standards, a base plate secured to said standards, a foraminous beater member secured between the upper extremities of said standards, a cam shaft rotatably mounted below said beater member, shafts arranged laterally of and below said cam shaft, a plurality of arms pivotally secured to said shafts, eraser holders secured to the upper extremities of said arms, bearing rollers carried by the arms, said arms being arranged in pairs, springs connecting the arms of each pair, and normally tending to retain the latter in engagement with said foraminous beater member, a hand crank carried by said cam shaft, and a plurality of cams secured to said cam shaft between the standards, said cams being formed with circumferential channels to act as guides and permit the arms to come in contact with the beater member.

In testimony whereof I affix my signature in presence of two witnesses.

JOHN W. JOHNSON.

Witnesses:
BERTHA GILES,
MARIE BARRETT.

Copies of this patent may be obtained for five cents each, by addressing the "Commissioner of Patents, Washington, D. C."